United States Patent [19]

Cromwell et al.

[11] Patent Number: 4,775,975

[45] Date of Patent: Oct. 4, 1988

[54] DIAL TONE DETECTION ARRANGEMENT WITH A DETECTION NOTIFICATION FEATURE

[75] Inventors: Jeffrey A. Cromwell, Westminster; Robert L. Ducharme, Arvada, both of Colo.

[73] Assignee: American Telephone and Telegraph Company and AT&T Information Systems Inc., Holmdel, N.J.

[21] Appl. No.: 802,172

[22] Filed: Nov. 26, 1985

[51] Int. Cl.⁴ .............................................. H04J 3/12
[52] U.S. Cl. ................................. 370/110.3; 379/209; 379/257
[58] Field of Search ............... 370/110.3; 179/18 AD, 179/18 BC, 18 BD, 18 BE; 379/209, 257

[56] References Cited

U.S. PATENT DOCUMENTS

| | | | |
|---|---|---|---|
| 2,958,734 | 11/1960 | Forrest | 179/18 BD |
| ',551,601 | 12/1970 | Sloan | 379/209 |
| 3,725,597 | 4/1973 | Streisand | 379/257 |
| 3,854,014 | 12/1974 | Akin et al. | 379/209 |
| 3,927,272 | 12/1975 | Bloxham et al. | 179/18 AD |
| 3,934,095 | 1/1976 | Matthews et al. | 379/257 |
| 3,956,595 | 5/1976 | Sobanki | 379/209 |
| 4,051,327 | 9/1977 | Rigsby | 379/209 |
| 4,132,868 | 1/1979 | Caputo | 179/18 BD |
| 4,188,511 | 2/1980 | Smith et al. | 179/18 AD |
| 4,460,807 | 7/1984 | Kerr et al. | 179/18 BC |
| 4,475,189 | 10/1984 | Herr et al. | 179/18 BC |
| 4,544,804 | 10/1985 | Herr et al. | 179/18 BD |
| 4,577,065 | 3/1986 | Frey et al. | 179/18 BC |
| 4,600,814 | 7/1986 | Cunniff et al. | 179/18 BC |

*Primary Examiner*—Robert L. Griffin
*Assistant Examiner*—Stephen Chin
*Attorney, Agent, or Firm*—Donald M. Duft; James M. Graziano; David Volejnicek

[57] ABSTRACT

A dial tone detection arrangement for a PBX which provides a dial tone detection notification feature to a calling party is disclosed. The disclosed arrangement relieves the calling party from the burden of aurally monitoring the receiver of a station while waiting for receipt of central office (C.O.) dial tone. The dial tone detection notification feature is advantageous under conditions where the calling party places a call to a called station served by the C.O. and experiences extensive delays, e.g. 30 minutes, in the receipt of C.O. dial tone. The dial tone detection arrangement utilizes an algorithm to establish a connection between a dial tone detection circuit of the PBX and a trunk port connected to a C.O. via a switching network. The dial tone detection circuit monitors the C.O. via the trunk port for the presence of dial tone indicative of C.O. availability. The calling party may now go "on-hook" and await a notification at the calling station indicative of the detection of dial tone. In response to the notification, the calling party goes "off-hook" and a call connection between the calling and called stations is established.

19 Claims, 7 Drawing Sheets

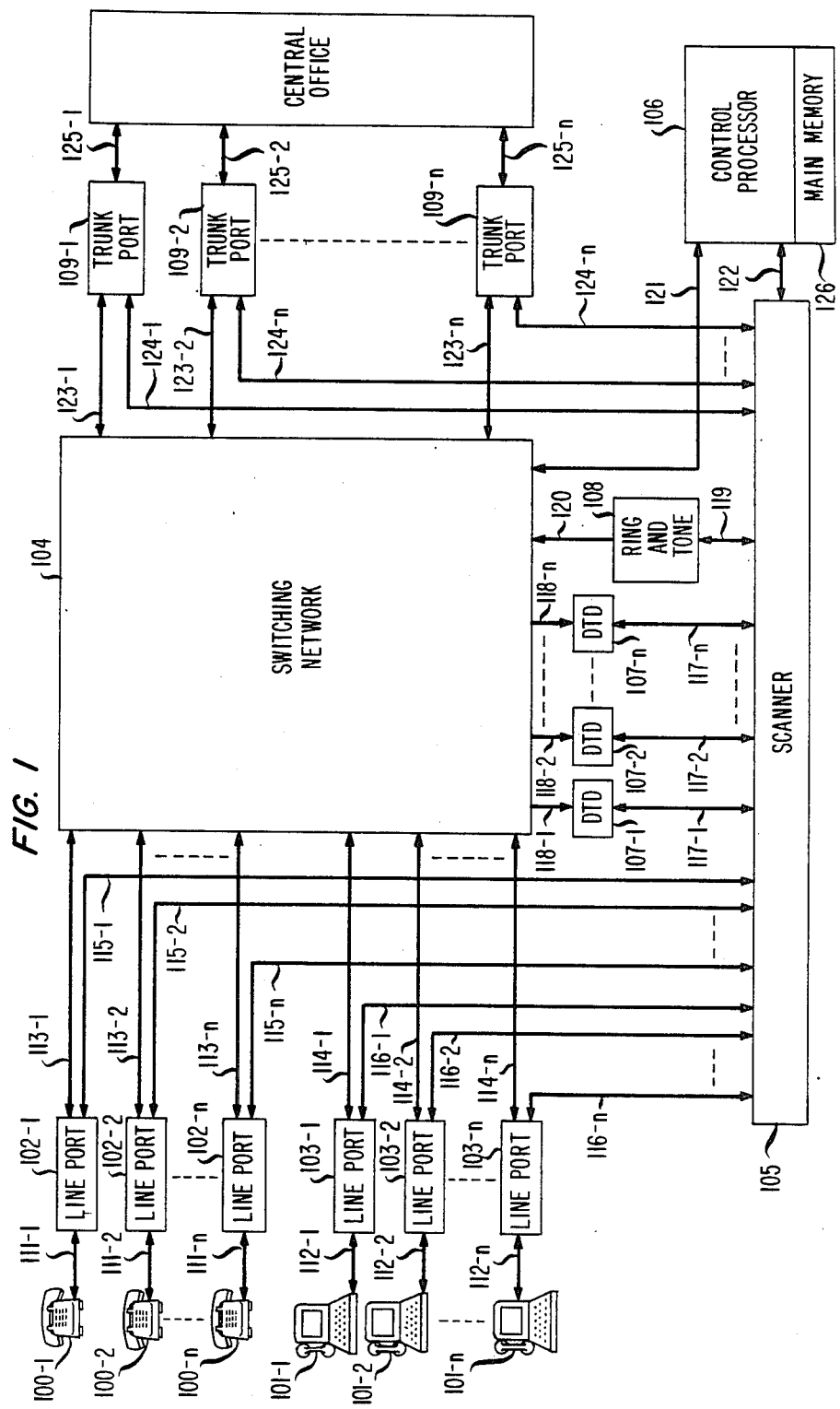

FIG. 2

CALL PROGRESS TABLE

| STATION IDENTITY | OFF-HOOK | TRUNK QUEUE | TRUNK AND DTD CIRCUIT SEIZED | ASSIGNED TIME SLOT | DIAL TONE DETECTED | DESTINATION IDENTITY |
|---|---|---|---|---|---|---|
| 100-1 | 1 | 1 | 1 | A | 1 | XXXXXXXXX |
| 100-2 | 1 | 1 | 1 | B | 0 | XXXXXXXXX |
| 100-3 | 1 | 1 | 0 | — | 0 | XXXXXXXXX |
| 100-4 | 1 | 0 | 1 | D | 1 | XXXXXXXXX |
| 100-5 | 1 | 0 | 1 | E | 0 | XXXXXXXXX |
| ... | ... | ... | ... | ... | ... | ... |
| 100-n | 0 | 0 | 0 | — | 0 | XXXXXXXXX |

FIG. 3

TRUNK QUEUE TIMER

| STATION IDENTITY | TIME LEFT (min.) |
|---|---|
| 100-1 | 60 min. |
| 100-2 | 30 min. |
| 100-3 | 0 min. |
| 100-4 | 0 min. |
| 100-5 | 0 min. |
| ... | ... |
| 100-n | — |

DIAL TONE DETECTION TIMER

| STATION IDENTITY | TIME LEFT (min.) |
|---|---|
| 100-1 | 60 min. |
| 100-2 | 0 min. |
| 100-3 | — |
| 100-4 | 60 min. |
| 100-5 | 0 min. |
| ... | ... |
| 100-n | — |

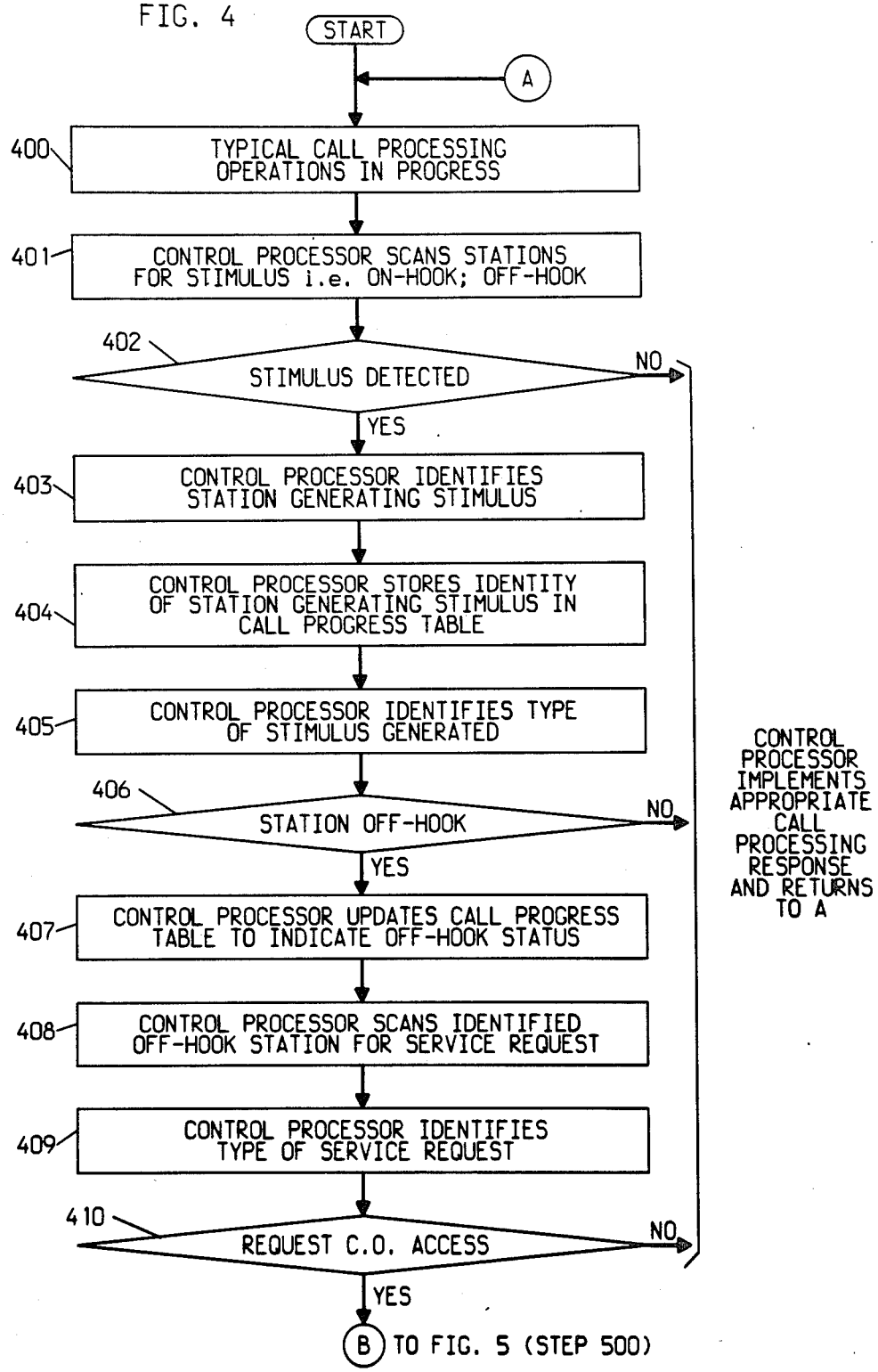

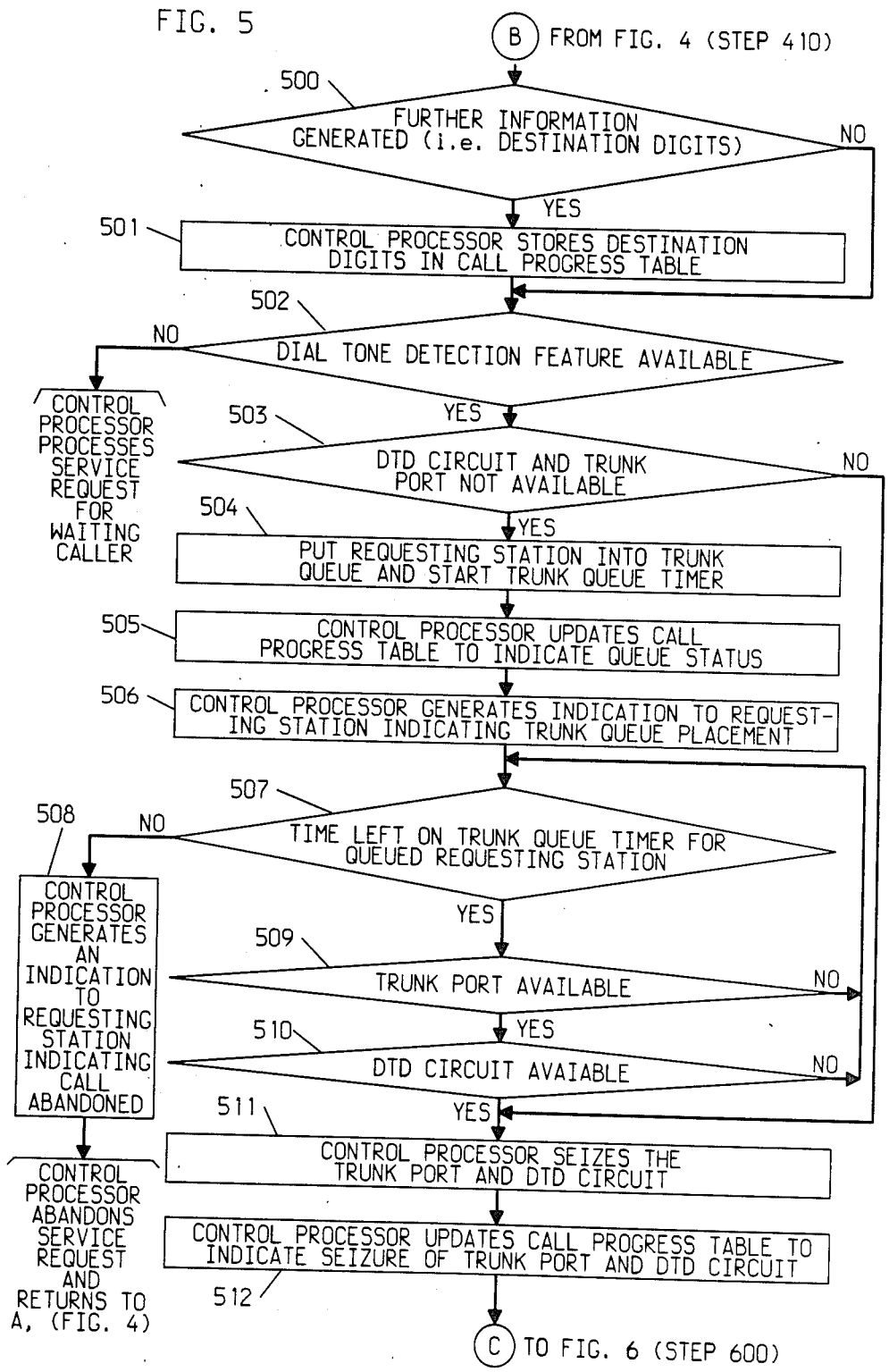

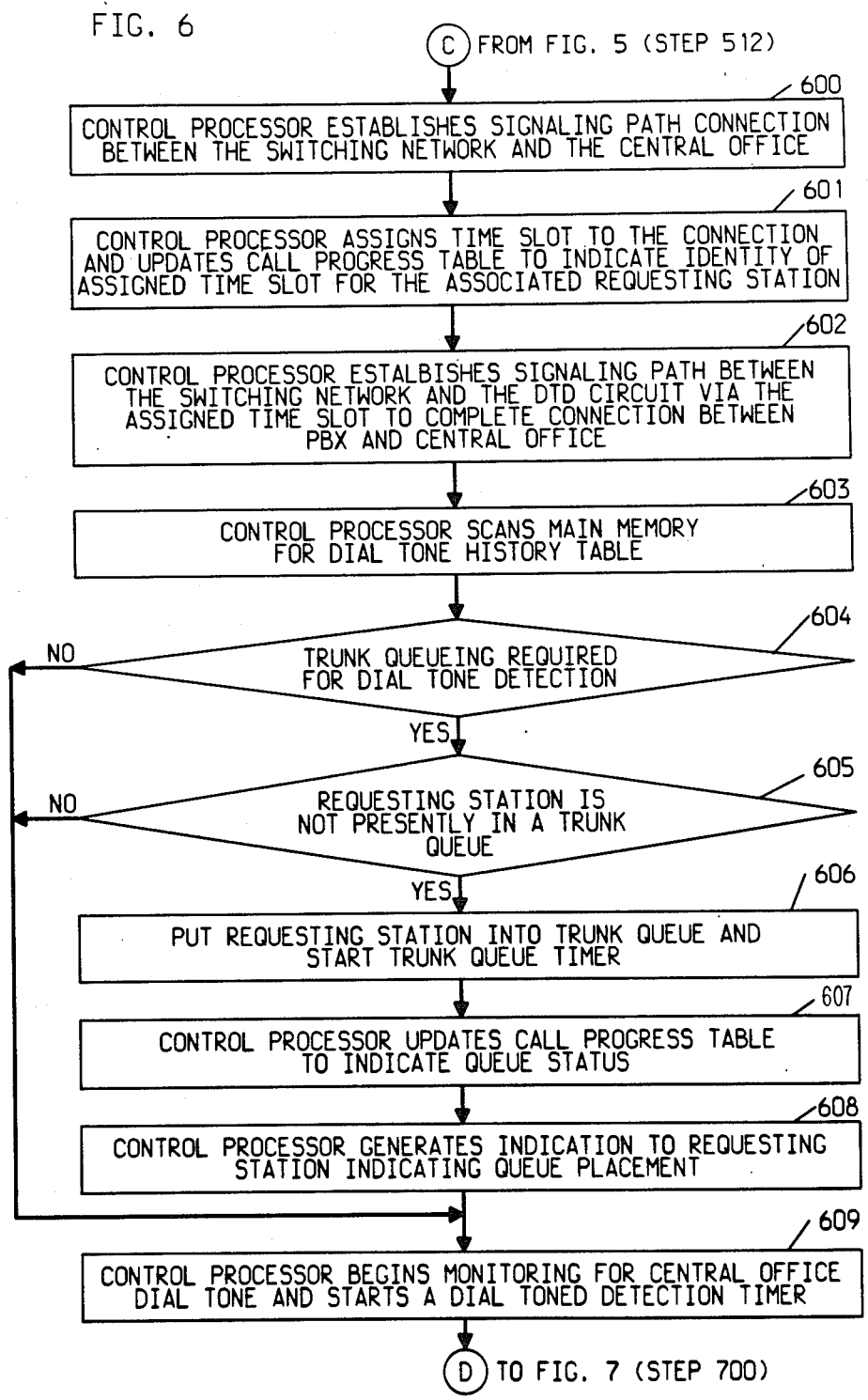

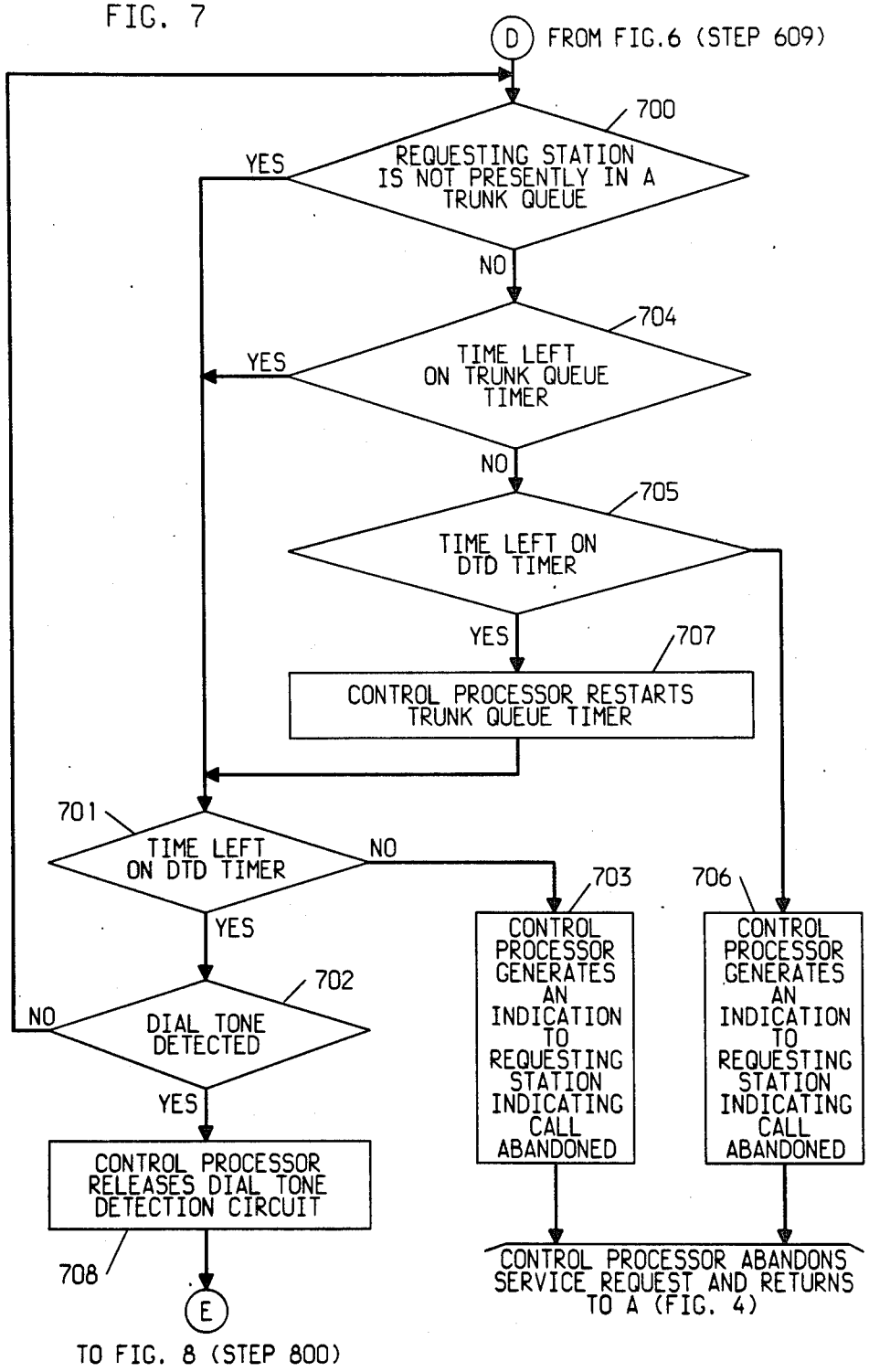

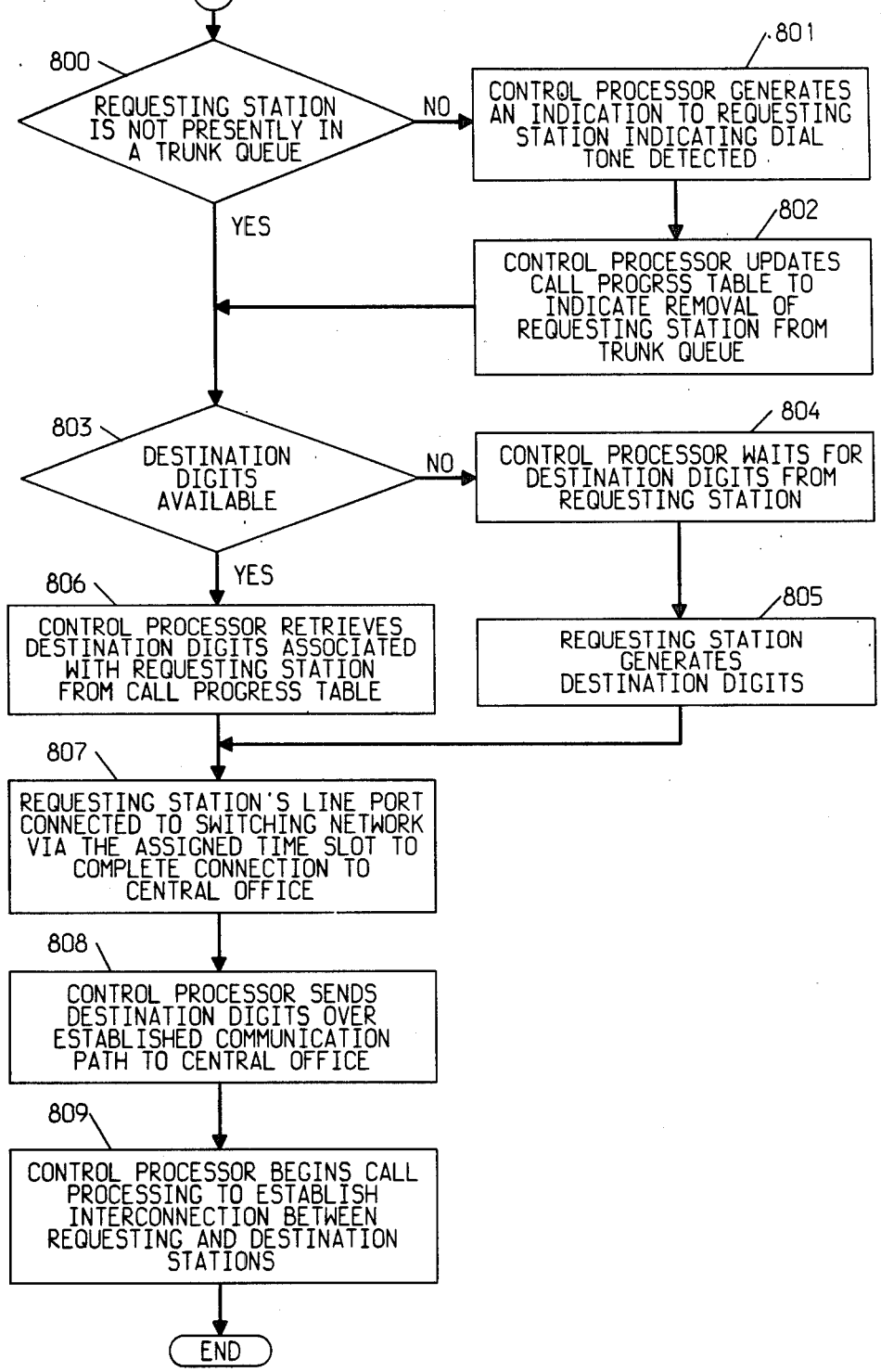

DIAL TONE DETECTION ARRANGEMENT WITH A DETECTION NOTIFICATION FEATURE

TECHNICAL FIELD

This invention relates to Private Branch Exchanges (PBXs) and, in particular, to an arrangement for detecting dial tone from a Central Office (C.O.). This arrangement further provides detection notification to a calling party following the detection of dial tone where long dial tone delays are commonplace in establishing a call connection to a destination outside the PBX.

BACKGROUND OF THE INVENTION

Private Branch Exchanges (PBXs) are becoming increasingly complex, and offer a user a variety of sophisticated features. Many of the offered features are implemented with little or no user interaction because the PBX includes a number of internal processes responsive to specified conditions to automatically activate several of the features. An example of one such feature is automatic call forwarding. Automatic call forwarding occurs when an incoming call is received at a station and is not answered. The incoming call is automatically forwarded following a specified number of rings to a cover station where the call can then be answered. The automatic call forwarding feature is not burdensome to the user because the PBX utilizes an internal monitoring scheme for detecting the specified number of rings and, then, automatically implements the cover function without user interaction. There still exists, however, a number of PBX operations that excessively burden the user.

One such operation that may be burdensome is the establishment of a call connection outside the PBX. To establish an outside call connection, a calling party must first gain access to a Central Office (C.O.) and then, the C.O. must be available to serve the call. The calling party gains access to a C.O. by dialing an access code, typically a "9". The PBX, responds to the dialing of the "9" and accesses the C.O. by seizing a trunk port of the PBX. The C.O. indicates its availability by generating a dial tone and applying the dial tone to the calling PBX station. The calling party may now dial the digits of a destination or called station. The calling party at the calling station remains "off-hook" and aurally monitors the receiver of the requesting station while waiting for the receipt of C.O. dial tone. In the United States and certain other countries having advanced telecommunication systems, C.O. dial tone is received in a relatively short time period, e.g. 2 seconds. However, in certain other countries having less than optimal telecommunication systems, the receipt of C.O. dial tone may take several minutes, e.g. 30 minutes. Therefore, aural monitoring for C.O. dial tone by the calling party may be burdensome on the calling party since aural monitoring requires the calling party to remain "off-hook" for an indeterminate period of time and prevents the calling party from pursuing other activities during this time. Heretofore, no arrangement exists which relieves a calling party from aural monitoring for C.O. dial tone.

SUMMARY OF THE INVENTION

The above-described disadvantages are overcome by the disclosed dial tone detection arrangement having a detection notification feature which relieves the calling party from the burden of aurally monitoring the receiver of a requesting station while waiting for the receipt of C.O. dial tone. The disclosed arrangement allows the PBX to utilize internal processing steps to monitor for C.O. dial tone without the calling party's interaction and then, to generate a notification to the calling party indicative of C.O. dial tone.

The PBX comprises a control processor which controls interconnections between a plurality of stations of the PBX and the C.O. The control processor includes a main memory in which are stored a plurality of call processing algorithms where each algorithm is associated with a specific service request. Assume that a calling party at one of the stations generates a service request for establishing a call connection outside the PBX. The control processor implements the associated call processing routine to satisfy the generated service request and seizes a trunk port to gain C.O. access. If a trunk port is not immediately available, the requesting station is put into a trunk queue and waits for a next available trunk port. When a trunk port is seized, the calling party aurally monitors for C.O. dial tone to determine C.O. availability to complete the call connection. In the subject arrangement, the C.O. access algorithm includes additional steps which can be implemented where long dial tone delays are anticipated. These additional steps direct the control processor to seize concurrently a trunk port to provide C.O. access and a dial tone detection circuit to provide dial tone detection capability independent of a calling party's aural monitoring. The control processor establishes a connection between the seized dial tone detection (DTD) circuit and the seized trunk port via a switching network which serves to exchange "data" between the connected DTD circuit and trunk port. The data exchanged includes information as to the generation of dial tone from the C.O.

The calling party can go "on-hook" following trunk port and DTD circuit seizure or placement in a trunk queue awaiting seizure. The control processor, then, activates a decremental dial tone detection timer which is set for some specified time limit, e.g. 60 minutes. If the DTD circuit does not detect dial tone within the specified time limit, the call is abandoned. However, if the DTD circuit detects dial tone within the specified time limit, the control processor disengages the connection between the DTD circuit and the trunk port, and establishes a connection between the requesting station and the trunk port. The control processor then generates a notification, e.g. an audio indication such as ring-back or a visual indication, to the requesting station to indicate to the calling party that the C.O. is now available to complete the call connection to a destination outside the PBX.

The above-described arrangement relieves the calling party from the burdensome activity of aurally monitoring the receiver of a station for C.O. dial tone by providing a dial tone detection arrangement which monitors for C.O. dial tone independent of the calling party and then applies to the requesting station an indication that the C.O. is available. The subject feature arrangement is automatically implemented under conditions where long dial tone delays are typical. Additionally, this arrangement requires no modification to the existing hardware of a PBX and may be customized to an existing system in an economical manner.

BRIEF DESCRIPTION OF THE DRAWING

The forgoing and other advantages of this invention will be apparent from the following detailed description of one possible exemplary embodiment thereof, which when read in conjunction with the accompanying drawings, in which;

FIG. 1 illustrates a typical Private Branch Exchange (PBX);

FIG. 2 illustrates state tables comprising the main memory of the control processor of FIG. 1;

FIG. 3 illustrates a decremental trunk queue timer and a decremental dial tone detection timer included the control processor of the PBX of FIG. 1; and FIGS. 4 through 8 illustrate in flow chart form, the steps specifying the operation of the dial tone detection algorithm having the detection notification feature utilized in the subject arrangement.

DETAILED DESCRIPTION

FIG. 1 discloses a typical Private Branch Exchange (PBX) comprising a plurality of communication devices such as station sets 100-1 through 100-n and digital terminal equipment having associated station sets 101-1 through 101-n. These communication devices connect over paths 111-1 through 111-n and 112-1 through 112-n to associated line ports 102-1 through 102-n and 103-1 through 103-n. Line ports 102-1 through 102-n and 103-1 through 103-n interface with switching network 104, scanner 105 and control processor 106.

Control processor 106 is of the stored-program type and controls the interconnections between the communication devices of FIG. 1. For ease of discussion, the remainder of this description uses the term station to refer to the various types of communication devices. Processor 106 includes main memory 126. Memory 126 contains various call processing algorithms which are implemented in response to a stimulus received from the stations of the PBX. A stimulus may indicate an "off-hook" or "on-hook" condition of a station. Scanner 105 operates under control of processor 106. Scanner 105 scans line ports 102-1 through 102-n and 103-1 through 103-n over paths 115-1 through 115-n and 116-1 through 116-n to detect the appearance of a stimulus, e.g. "on-hook" or "off-hook", as generated from any one of the stations 100-1 through 100-n and 101-1 through 101-n. The line ports 102-1 through 102-n and 103-1 through 103-n receive signals over paths 111-1 through 111-n and 112-1 through 112-n from the stations 100-1 through 100-n and 101-1 through 101-n. These signals, which are generated in response to a stimulus, indicate the condition of the stations. Scanner 105 detects each change in stimulus, for example, a change from an "on-hook" condition to an "off-hook" condition, and applies an indication of the stimulus over path 122 to processor 106. Processor 106 responds to the receipt of this stimulus indication and implements routine call processing algorithms. Processor 106 generates control information to establish interconnections between stations.

These interconnections are established via switching network 104 which serves to exchange information, i.e. "voice or data", between the stations associated with each interconnection. Switching network 104 operates under control of processor 106 over path 121 and is advantageously of the digital type, and includes a time slot interchanger such as the type described in U.S. Pat. No. 4,112,258 issued to H. G. Alles on Sept. 5, 1978 and U.S. Pat. No. 4,485,469 issued to R. K. Witmore on Nov. 27, 1984. A time slot interchanger (not shown) connects one line port with another line port during an assigned time slot or slots. Assume for the remainder of this description that a single time slot is assigned. The assigned time slot provides for information exchange between each of the line ports having an associated station to establish and maintain an interconnection between a calling and destination or called stations.

Processor 106 additionally controls a number of system timers (not shown). The system timers comprise a plurality of decremental timers such as those illustrated in FIG. 3 which start decrementing in response to some specified stimulus. These decremental timers provide time-monitoring functions for PBX operations having time-dependent activity. These timers are discussed subsequently.

The following discussion briefly describes the process of establishing connections between the stations of the PBX in FIG. 1. Processor 106 responds to an "off-hook" stimulus indication as received from a calling station, e.g. station 100-1, via scanner 105. A party at the calling station, then, dials destination digits identifying a called station, e.g. station 101-1, of the PBX. Processor 106 identifies the called station in response to the receipt of the "dialed" digits and assigns a specific time slot for the connection in switching network 104. Processor 106 generates connection control data via path 121 to the assigned time slot to complete the connection between the calling and called stations. Processor 106 notifies the calling and called parties of the established connection by activating ring and tone generator 108 over path 119 via scanner 105. Ring and tone generator 108 applies a ringing signal over path 120 to the assigned time slot for the connection. The ringing signal provides ring-back to the originating station concurrently with ringing at the destination station. Assume that the called station goes "off-hook", scanner 105 detects this "off-hook" stimulus at the called station and applies an indication of this stimulus over path 122 to processor 106. Processor 106 responds to this indication and deactivates ring and tone generator 108 so as to remove ringing from the connection between the calling and the called stations. Switching network 104 maintains the assigned time slot for the connection so that the calling and called station can exchange "voice and/or data" during the established connection.

As previously indicated, control processor 106 contains a number of call processing algorithms which administer the various interconnections between stations such as the one described above. Each call processing algorithm comprises a list of stored instructions which direct routine call processing operations. Call processing establishes and disengages call connections between the various stations comprising the PBX. In addition to routine call processing algorithms, main memory 126 of processor 106 also contains various feature processing algorithms. Each feature processing algorithm also comprises a list of instructions that specify processing operations for implementing a desired feature. The feature processing algorithms respond to service requests which are generated either by a user that dials a specified feature code, depresses a specified feature button, or by a set of predefined conditions where the feature algorithm is automatically implemented when the set of conditions exist. Processor 106 accesses memory 126 in response to the "dialed" feature code, the "depression" of a feature button or the "set of conditions", and implements the appropriate feature algorithm by branching from the routine call processing algorithm to the requested feature processing algorithm to satisfy the request.

One such feature processing capability of the PBX of FIG. 1 includes accessing trunk facilities such as a Central Office (C.O.) to serve incoming and outgoing call connections. Prior to describing the processing operations involved in incoming and outgoing call connections from and to the trunk facilities, the following describes the interconnections between the elements of the PBX and the trunk facilities.

Processor 106 also controls connections between the station(s) of the PBX and the trunk ports extending to the Central Office (C.O.) of FIG. 1. The PBX connects to trunk ports 109-1 through 109-n over paths 123-1 through 123-n and paths 124-1 through 124-n. Incoming and outgoing calls from the C.O. are received and extended over trunks 125-1 through 125-n via the trunk ports 109-1 through 109-n. Processor 106 establishes interconnections between the PBX stations and the C.O. in the same manner previously described with respect to the interconnections between the stations of the PBX when stations of the same PBX request call connections.

Briefly, with respect to incoming calls from the C.O. to any one of the stations 100-1 through 100-n and 101-1 through 101-n, the C.O. generates a stimulus indicative of an incoming call over one of the paths 125-1 through 125-n to an associated trunk port 109-1 through 109-n. Scanner 105 detects the incoming call stimulus, from the C.O. over an associated path 124-1 through 124-n of the trunk port receiving the stimulus, and applies this stimulus indication over path 122 to control processor 106. Processor 106 responds to this stimulus indication and implements an appropriate call processing algorithm as retrieved from main memory 126 to satisfy the connection request. The algorithm identifies the destination or called station of the PBX associated with the incoming call, assigns a time slot to the connection in switching network 104, and establishes the connection between the C.O. and the called station via switching network 104. Processor 106 activates ring and tone generator 108 over path 119 via scanner 105 to generate ringing to the called station, and send ring-back to the C.O. in the manner previously described with respect to a station to station connection of the PBX. The called station goes "off-hook" to complete the connection between the C.O. and a calling station.

In the above-described manner, incoming calls from the C.O. to the PBX are established. The remainder of this discussion describes the process of establishing an outgoing call from a station of the PBX to a destination outside of the PBX such that the connection must extend through the C.O. The subject dial tone detection arrangement having a detection notification feature is applicable to the establishment of outgoing call connections. FIGS. 4 through 8 illustrate in flow chart form the steps of the algorithm comprising the subject dial tone detection arrangement. Prior to describing the implementation of those portions of the algorithm applicable to dial tone detection, FIG. 4 briefly summarizes the steps included in establishing a request for the C.O. This process is well-known and therefore will be only briefly described.

Assume typical call processing operations are in progress, step 400. Processor 106 scans via scanner 105 stations 100-1 through 100-n and stations 101-1 through 101-n for a change in stimulus, for example, "on-hook" to "off-hook", step 401. If no stimulus is detected at step 402, call processing returns to point A and resumes typical call processing operations. Assume that a stimulus is detected from one of the stations, e.g. station 100-1, of the PBX shown in FIG. 1. Processor 106, in response to the detected stimulus, identifies the station generating the stimulus, step 403, and stores the identity of the station in a call progress table, step 404. FIG. 2 illustrates a call progress table. Main memory 126 comprises the call progress table which is established by processor 106 during call processing operations. The call progress table identifies the current status of each of the stations included in the PBX during the establishment or disengagement of a call connection. Processor 106 continually updates the table to reflect the current condition of each station during call processing operations. Call progress tables typically contain a variety of information; however, for the purpose of this discussion which is related to the disclosed arrangement, the call progress table of FIG. 2 indicates only the information relating to the progress of outgoing calls. The call progress table of FIG. 2 includes the stations of the PBX illustrated in FIG. 1 as these stations may currently appear at one stage of an outgoing call processing operation.

Processor 106, following the update of the call progress table with the identity of the generating station, identifies the type of stimulus generated, step 405. If the station generates a stimulus other than an "off-hook" stimulus, processor 106 implements the appropriate call processing response and returns to point A of the call processing operations, step 406. Assume, however, that the generated stimulus is on "off-hook" indication. Processor 106 updates the call progress table of FIG. 2 to indicate the change in status of the generating station at step 407, i.e. station 100-1 is associated with an "off-hook" status. The call progress table of FIG. 2 illustrates that stations 100-1 through 100-5 are currently "off-hook". In response to the "off-hook" stimulus indication, processor 106 scans the identified "off-hook" station for a service request at step 408. A service request includes a feature request or a connection request to a destination or called station which is generated by a party at the requesting station, as previously described, either by depressing specified feature buttons, dialing prescribed digits, or having the existence of a set of redefined conditions. Processor 106 indentifies the type of service request generated by the party at the requesting station at step 409. If the service request at step 410 is other than for C.O. access, i.e. a request for a feature such as call forwarding, processor 106 implements an appropriate call processing response to satisfy that request and returns to point A following the servicing of the request. Assume, however, that the request is for C.O. access, and that the party at the requesting station has generated the request by dialing the appropriate code, e.g. "9". This indicates that the station is requesting a destination outside the PBX. Processing then continues to step 500 of FIG. 5 to begin processing the outgoing call connection.

Processor 106, in response to the C.O. access request, monitors the requesting station for further information, i.e. destination digits identifying the called station, step 500. If no further information is generated within an allotted time period, e.g. 2 seconds, processing continues to step 502. A decremental timer (not shown) included in the control processor provides the mechanism by which to determine the elapse of the allotted time period. The activation of the timer step and the monitoring for time-out on the timer step are not shown since these steps do not comprise any portion of the subject invention. This information is merely for background purposes. Assume the party at the identified requesting station does dial destination digits immediately following the C.O. access code such that the allotted time period of the decremental timer has not elapsed, processor 106, then, stores at step 501 the destination digits in an associated memory location of the requesting station in the call progress table of FIG. 2. The described algorithm may be designed to accommodate the option of either immediately dialing the destination digits following the dialing of the C.O. access code or delay the dialing of the digits until the C.O. is accessed. Processing continues to step 502 in either case.

Step 502 indicates the availability of the dial tone detection feature to the requesting station of the PBX. If the feature is unavailable, the calling party must remain "off-hook" while control processor 106 processes the C.O. service request, and the calling party aurally begins monitoring for the receipt of C.O. dial tone. This process of aurally monitoring the receiver of the station for dial tone is known to the art and is not described in further detail. Assume the feature at step 502 is available and therefore, processing proceeds to step 503. To establish an outgoing call connection between a station of the PBX and a destination outside of the PBX utilizing the dial tone detection feature, processor 106 must access the C.O. by seizing both a dial tone detection (DTD) circuit and trunk port. The trunk port, as previously described, interfaces between the C.O. and the PBX, and receives from and extends to the C.O. call information, i.e. call connection data, data, voice, etc. If a trunk port is not immediately available for seizure, the requesting station is placed in a trunk queue until such time as a trunk port becomes available. Trunk queuing and an associated trunk queue timer are described subsequently. A DTD circuit is concurrently seized with a trunk port. DTD circuits 107-1 through 107-n of FIG. 1 operate under control of processor 106 over paths 117-1 through 117-n via scanner 105. DTD circuits 107-1 through 107-n connect to switching network 104 over paths 118-1 through 118-n. The DTD circuits detect the application of dial tone from the C.O. DTD circuits and the operation of the DTD circuits to detect dial tone are known to the art, and therefore, no further details follow as to the operation of the DTD circuits. However, the utilization of the DTD circuits with respect to the disclosed feature is described subsequently.

Steps 503 through 512 of FIG. 5 describe the process of seizing a DTD circuit and trunk port to gain C.O. access and to provide C.O. dial tone detection capability. Processor 106 at step 503 scans trunk ports 109-1 through 109-n and DTD circuits 107-1 through 107-n of FIG. 1 via scanner 105 to detect the concurrent availability of both a port and a circuit. If a DTD circuit and trunk port are concurrently available, processor 106 proceeds to step 511 and seizes the available trunk port and DTD circuit. Assume, however, that a DTD circuit and trunk port are not immediately available at step 503. Processor 106 at step 504 detects the unavailability of a port and a circuit and puts the identified requesting station into a trunk queue. Trunk queuing places each requesting station in a position in "line" and based on the requesting station's position in line, the requesting station will seize the "next" available trunk port and DTD circuit.

A common queuing method is FIFO (First In—First Out) where first in time with a service request is first in line for the next available trunk port and DTD circuit. Processor 106 controls the trunk queuing operations. Since trunk queuing is a well-known operation, no further detail is provided. Concurrently, with placing a requesting station in a trunk queue to await an available trunk port and DTD circuit, processor 106 at step 504 starts a decremental trunk queue timer such as the timer illustrated in FIG. 3. The trunk queue timer is one of the discremental timers, previously discussed, comprising processor 106. This trunk queue timer provides for an allotted time period in which processor 106 may seize an available trunk port and DTD circuit in response to the generated C.O. access service request.

As previously described, the call progress table maintains a current status on each of the stations in the PBX and therefore, processor 106, at step 505, updates the call progress table of FIG. 2 to indicate that the requesting station has been placed in trunk queue. The call progress table of FIG. 2 indicates that currently stations 100-1 through 100-3 are in a trunk queue and that stations 100-4 through 100-n are not in a trunk queue. Trunk queuing is required at this point in processing when a trunk port and a DTD circuit are unavailable for seizure. Processor 106, at step 506, generates an indication, e.g. a confirmation tone such as three "beeps", to the requesting station indicating that the requesting station is currently placed in a trunk queue. The party at the requesting station may at this time go "on-hook" to await trunk port and DTD circuit seizure. In prior art arrangements, the party at the requesting station could still go "on-hook" following receipt of an indication of trunk queue placement since a ring-back notification at the requesting station occurred when a trunk port was seized. When a ring-back indication occurred, the party at the requesting station went "off-hook" to monitor for C.O. dial tone. However, since the detection notification feature is available, the party at the requesting station may remain "on-hook" until such time as C.O. dial tone is detected or the dial tone detection time elapses. This process of dial tone detection is discussed subsequently.

Steps 507 through 510 define the process of seizing an available trunk port and DTD circuit within the allotted time period defined by the trunk queue timer. If the trunk queue timer fully decrements, i.e. 0 minutes left, without concurrently seizing a trunk port and DTD circuit, processor 106 advances to step 508 and generates an indication, e.g. three short consecutive ring-bursts, to the requesting station indicating that the call is being abandoned. Processor 106, then, abandons the service request and returns to point A of the call processing operation of FIG. 4. A new service request must be generated by the party at the requesting station to gain C.O. access. Assume, however, that the trunk queue timer does not fully decrement and that a trunk port and DTD circuit are concurrently available at steps 509 and 510, respectively, processor 106 advances to step 511 and seizes the available trunk port and DTD circuit. Processor 106 at step 512 updates the call progress table of FIG. 2 to indicate that the trunk port and DTD circuit have been seized for the requesting station. The call progress table always reflects the current status of each station in the PBX.

In prior art arrangements, as previously discussed, the control processor activates a ring and tone generator (discussed in more detail, subsequently) to generate ring-back to the requesting station following C.O. access. The party at the requesting station goes "off-hook" and begins the process of aurally monitoring for C.O. dial tone. Aural monitoring prevents the party at the requesting station from pursuing other activities and wastes that party's time. However, since the feature is available, the party at the requesting station can remain "on-hook" until that party receives an indication that the PBX detects C.O. availability through the detection of dial tone or until such time as the dial tone detection timer times-out (discussed, subsequently).

For further implementation of this feature, processing proceeds to step 600 of FIG. 6. At this point in processing the party at the requesting station may either be "on-hook" or "off-hook" depending on whether the requesting station was placed in a trunk queue. In either case, a seized dial tone detection circuit rather than a party's ear at the requesting station serves to detect C.O. dial tone. Processor 106 at step 600 establishes a signaling path connection between the C.O. and switching network 104 which links the C.O. to the PBX. Processor 106, then, at step 601 assigns a time slot to the connection in switching network 104 and updates the call progress table of FIG. 2 to indicate the assigned time slot for the connection having an associated requesting station. For example, station 100-1 is associated with assigned time slot A on its connection. Processor 106, at step 602, establishes a signaling path connection from switching network 104 to the DTD circuit. A complete signaling path connection between the trunk port and the DTD circuit now exits via the assigned time slot, i.e. the facilities of the PBX connect to the facilities of the C.O. The assigned time slot of switching network 104 is used to exchange "connection data" between the two connected signaling facilities, i.e., the DTD circuit and the trunk port. The "connection data" includes the generation of C.O. dial tone which indicates C.O. availability to complete the call connection. In this manner, the DTD circuit monitors for C.O. dial tone and relieves the party at a requesting station from aurally monitoring the receiver to detect C.O. dial tone. Additionally, the dial tone detection signaling path establishment is accomplished independent of a party's interaction and, in essence, the signaling path takes the place of the party's ear. The above describes the manner in which a signaling path connection between the C.O. and the DTD circuit is established for the detection of C.O. dial tone.

Steps 603 through 608 describe the process of utilizing trunk queuing processing when long C.O. dial tone delays are typical such as the delays experienced in certain countries having less than optimal telecommunication systems. Utilizing the trunk queuing process alleviates the need for providing a separate dial tone detection notification process. The trunk queueing process is utilized to provide a notification indication, e.g. ring back, to a calling party at a requesting station when the calling party goes "on-hook". Since generating a notification indication is a "normal" part of the trunk processing routine involving queueing, the processing routine is utilized with the dial tone detection arrangement to economize by utilizing existing capabilities. The trunk queueing processing notification indication capability is used when excessive dial tone delays from the C.O. typically occur.

Processor 106 at step 603, scans main memory 126 to determine if dial tone delays are excessive in accessing the C.O. Memory 126 maintains some type of stored record (not shown) to indicate if excessive delays are typical. One method of providing a record is a user programmable history table where the user over a period of time records the delays associated with the receipt of C.O. dial tone on each request for C.O. availability. Following an average sampling of a number of requests and recording the delays actually experienced in the table, a threshold value of delay time is selected. This selected threshold value indicates the maximum amount of delay time which is tolerated. Therefore, at step 603, processor 106 scans a record, e.g. a history table, to determine if the selected threshold value is exceeded often such as, for example, 50% of the time C.O. call connections are requested. Obviously, the percentage of time is user programmable so that if any delays have been experienced the detection notification process is implemented. If dial tone delays normally do not exceed the threshold value given a percentage, then, call processing advances to step 609. Step 609 is discussed subsequently.

Assume, however, that trunk queuing is required since the threshold value is exceeded 50% of the time indicating excessive dial tone delays are typical. Processor 106 advances to step 605. If the requesting station is currently in a trunk queue as indicated by the call progress table of FIG. 3, the remaining queue placement steps 606 and 607 are by-passed. A requesting station may have already been placed in a trunk queue at step 503 of FIG. 5. Processor 106 determines the trunk queue status of a requesting station by scanning the call progress table of FIG. 3. When trunk queue placement has occurred during the previous processing steps, the requesting station remains in the queue until such time as the C.O. becomes available, i.e. C.O. dial tone is detected. If previous trunk queue placement occurred, call processing proceeds to step 609 which is discussed subsequently. If, however, the requesting station is not presently in a trunk queue, processor 106 implements queue placement by carrying out steps 606 through 608. Trunk queue placement, the activation of the trunk queue timer, the updating of the call progress table and the generating of an indication were previously described in steps 504 through 506. The requesting station is processed in the same manner at this portion of the routine and therefore, no further detail is provided. Following trunk queue placement, as required by typically excessive dial tone delays, the party at the requesting station may now go "on-hook" to await notification indicating dial tone detection. If the party at the requesting station does not require trunk queue placement because dial tone delays are within the tolerable threshold, the party remains "off-hook" until the seized DTD circuit and not the party detect dial tone.

In either case of excessive dial tone delays requiring trunk queuing or tolerable dial tone delays where the party at the requesting station remains "off-hook", processing continues at step 609. Processor 106 begins monitoring for C.O. dial tone. The process of monitoring for C.O. dial tone is a timed function so that the station user does not indefinitely wait for a C.O. dial tone detection notification indication. Processor 106 at step 609 activates a decremental dial tone detection timer such as the timer illustrated on FIG. 3. The allotted time on the timer is set for some specified time period, e.g. 60 minutes. Processing now continues to step 700 of FIG. 7. The flow chart of FIG. 7 illustrates the timing events associated with detection of dial tone from the C.O. wherein either just the dial tone detection timer is utilized or both the trunk queue timer and dial tone detection timer are utilized. The trunk queue timer is active only when the requesting station is queued where dial tone delays are excessive. If the requesting station is not queued, only the dial tone detection timer is decrementing and processor 106 monitors for dial tone from the C.O during the allotted time period of the dial tone detection (DTD) timer, steps 701 and 702. If C.O. dial tone is detected within the allotted time period such that DTD timer has not timed-out, then processing advances to step 706 which is discussed subsequently. If the DTD timer has timed-out before dial tone is detected, processor 106 advances to step 703 and generates an indication, e.g. a reorder tone, to the requesting station indicating that the call is being abandoned. Processor 106, then, abandons the service request and returns to processing at point A of FIG. 4. The party at the requesting station following the time interval customarily allotted for detection notification, must generate a new service request for C.O. access.

Assume that the requesting station is in a trunk queue since excessive dial tone delays are typical and the party at the requesting station is "on-hook". Since trunk queue processing is in progress, the trunk queue timer of FIG. 3 is decrementing concurrently with the dial tone detection timer. If the trunk queue timer has not timed out at step 704, processor 106 then scans the dial tone detection timer to determine if a time-out has occurred at step 701. If no time-out on the dial tone detection timer occurred, then processor 106 at step 702 determines if the DTD circuit has detected dial tone. However, if the dial tone detection timer has timed-out, then processor 106 abandons the service request at step 701 and returns to processing at point A of FIG. 4 to await a new service request. Now assume that at step 703 the trunk queue timer has timed-out, but the DTD timer has not timed out at step 705. This event often occures when trunk queue placement was required for trunk port and DTD circuit seizure, and the requesting station remained in the queue placement was placed in a queue at a later time in processing. This also occurs when the trunk queue timer has an allotted time interval less than the allotted time interval for the DTD timer. Processor 106 at step 707 restarts the trunk queue timer for its allotted time period when the DTD timer has not timed out. Steps 704 through 707 illustrate that the DTD timer overrides the trunk queue timer because the DTD timer determines the acceptable allotted time period for dial tone detection. However, if the DTD timer has timed out at step 705, then processor 106 advances to step 706 and generates an indication, e.g. three short consecutive ring bursts, to the requesting station indicating that the call is being abandoned. Processor 106, then, abandons the service request and returns to processing at point A of FIG. 4. When the allotted dial tone detection period ends, the party at the requesting station may choose either to generate another C.O. access service request or to abandon the call entirely. Assume, now, that dial tone has been detected by the DTD circuit within the allotted time period at step 702. In response to the detected dial tone, processor 106 at step 708 removes the established signaling path connection between the DTD circuit and the switching network 104. Processing now continues to step 800 of FIG. 8.

Control Processor 106 scans the call progress table of FIG. 2 to detect whether the identified requesting station is presently in a trunk queue. If the requesting station is in a trunk queue, processor 106 advances to step 801 and generates a detection notification indication to the requesting station to notify the party at the requesting station that the C.O. is now available to complete the call connection, i.e. C.O. dial tone is detected. One method of providing notification is to provide "ring-back" to the requesting station. To provide "ring-back", processor 106 activates ring and tone generator 108 to provide "ringing" at the requesting station. Processor 106, then, updates the call progress table of FIG. 3 at step 802, to indicate that the requesting station is no longer in a trunk queue. If the requesting station is not in a trunk queue, processing bypasses steps 801 and 802 and proceeds to step 803. As previously described, the party at the requesting station has the option of dialing destination digits immediately following the C.O. access code or waiting until the C.O. is available as indicated by the detection notification indication. If the party at the requesting sstation did not dial destination digits, steps 804 and 805 allow the party at the requesting station ample time to generate the destination digits. However, if the destination digits were previously dialed, processor 106 retrieves the destination digits associated with the requesting station from the call progress table of FIG. 2 at step 806 and advances to step 807. Concurrently, while processing the operations of steps 800 through 806, processor 106 establishes a signaling or communication path connection from the associated line port of the requesting station to switching network 104 via the assigned time slot indicated in the call progress table of FIG. 2. A complete connection now exists between the line port of the requesting station and the trunk port of the C.O. via the assigned time slot of switching netowrk 104. Processor 106 now sends the destination digits over the established communication path to the available C.O. at step 808. Control processor 106 immediately begins traditional call processing to establish an interconnection between the requesting calling and the called stations at step 809.

The above described dial tone detection algorithm discloses an arrangement which utilizes a connection between a DTD circuit of a PBX and a trunk port of a C.O. via a switching network to provide a PBX with dial tone detection capability wherein the connection takes the place of calling party's ear and relieves the calling party from aurally monitoring the receiver of a station for C.O. dial tone where long dial tone delays are typical. This arrangement provides detection notification to a user when the C.O. is available. The subject arrangement additionally utilizes existing trunk queuing processing to provide a detection notification indication to requesting stations when excessively long dial tone delays are typical. The disclosed feature is automatically implemented by the PBX without a calling party's interaction where long dial tone delays from the C.O. are commonplace in establishing call connections outside the calling party's PBX.

What is claimed is:

1. In a switching system comprising a plurality of stations, a plurality of trunk ports connected to a central office and a switching network, a method for providing central office dial tone notification to a calling one of said plurality of stations, where significant delays occur in the application of dial tone by said central office to a trunk port on a call origination, said method comprising the steps of:

requesting a call connection from said one calling station to said central office;

establishing a first path between a selected one of said trunk ports and a dial tone detection circuit via said switching network to in response to said call connection request to detect a dial tone applied to said trunk port by said central office;

transmitting to said calling station, in response to the application of said central office dial tone to said selected trunk port an indication of said availability of said central office; and establishing, in place of said first path, a second path from said calling station via said switching network to said selected trunk port connected to said central office for serving said call.

2. The method of claim 1 wherein the step of establishing a first path includes the steps of:

seizing concurrently said selected trunk port and said dial tone detection circuit; and assigning a time slot in said switching network to interconnect said selected trunk port to said dial tone detection circuit.

3. The method of claim 1 wherein said step of establishing a first path is in combination with the steps of:

activating a timer to time for a specified allotted time period within which to detect said central office dial tone; and abandoning said call connection request when said timer times out.

4. The method of claim 2 wherein said step of establishing a second path is in combination with the steps of:

disengaging said dial tone detection circuit from said assigned switching network time slot to remove a portion of said first path; and utilizing said assigned switching network time slot to interconnect said calling station and said selected trunk port.

5. The method of claim 1 wherein the step of transmitting includes the step of:

activating an indicator at said calling station to provide an indication of said dial tone detection.

6. The method of claim 5 wherein the step of activating includes the step of:

providing an audible indication at said calling station to indicate said dial tone detection.

7. The method of claim 5 wherein the step of activating includes the step of:

providing a visual indication at said calling station to indicate said dial tone detection.

8. In a switching system where a calling station requests a call connection to a called station served by a central office, a method for providing central office dial tone notification to said calling station, where significant delays occur in the application of dial tone by said central office to said calling party, said method comprising the steps of:

establishing a first path between a trunk port connected to said central office and a dial tone detection circuit via a switching network to detect a dial tone applied to said trunk port by said central office;

transmitting to said calling station in response to the application of said central office dial tone to said trunk port an indication of said availability of said central office; and establishing, in place of said first path, a second path from said calling station via said switching network to said trunk port connected to said central office for serving said call connection.

9. The method of claim 8 wherein the step of establishing a first path includes the steps of:

seizing concurrently said trunk port and said dial tone detection circuit; and assigning a time slot in said switching network to interconnect said trunk port to said dial tone detection circuit.

10. The method of claim 8 wherein the step of establishing a first path is in combination with the steps of:

activating a timer to time for a specified allotted time period within which to detect said central office dial tone; and abandoning said call connection request when said timer times out.

11. The method of claim 2 wherein the step of establishing a second path is in combination with the steps of:

disengaging said dial tone detection circuit from said assigned switching network time slot to remove a portion of said first path; and utilizing said assigned switching network time slot to interconnect said calling station to said trunk port.

12. The method of claim 8 wherein the step of transmitting includes the step of:

activating an indicator at said calling station to provide an indication of said central office dial tone detection.

13. The method of claim 12 wherein the step of activating includes the step of:

providing an audible indication at said calling station to indicate said central office dial tone detection.

14. The method of claim 12 wherein the step of activating includes:

providing a visual indication at said calling station to indicate said central office dial tone detection.

15. In a PBX where a calling station requests a call connection to a called station served by a central office, a method for providing central office dial tone notification to said calling station, said method comprising the steps of:

operating said PBX to detect a dial tone from said central office;

responding to a presence of said central office dial tone to generate an indication to said calling station indicative of said central office availability; and establishing a path from said calling station via a switching network of said PBX to said central office for serving said call.

16. The method of claim 15 wherein the step of operating includes the steps of:

seizing concurrently a trunk port connected to said central office and a dial tone detection circuit to establish a path between said trunk port and said dial tone detection circuit; and assigning a network time slot to interconnect said trunk port and said dial tone detection circuit.

17. The method of claim 15 wherein the step of operating is in combination with the steps of:

activating a decremental timer to begin decrementing from a specified allotted time period within which to detect said central office dial tone; and abandoning said call connection request when said decremental timer fully decrements.

18. The method of claim 15 wherein the step of operating is in combination with the steps of:

scanning an excessive dial tone delay history table to identify when a predefined threshold value is exceeded to indicate that excessive central office dial tone delays exist; and entering said calling station into a trunk queue when excessive dial tone delays exist indicated by exceeding said predefined threshold value.

19. The method of claim 15 wherein the step of generating is in combination with the steps of:

removing said calling station from said trunk queue;
activating a ring and tone generator to provide a ringing indication at said calling station; and
establishing a path between said calling station and said called station served by said central office.

* * * * *

UNITED STATES PATENT AND TRADEMARK OFFICE
CERTIFICATE OF CORRECTION

PATENT NO. : 4,775,975

DATED : October 4, 1988

INVENTOR(S) : Jeffrey A. Cromwell and Robert L. Ducharme

It is certified that error appears in the above-identified patent and that said Letters Patent is hereby corrected as shown below:

Column 14, line 15, "claim 2" should read -- claim 9--.

Signed and Sealed this

Third Day of November, 1992

Attest:

DOUGLAS B. COMER

Attesting Officer

Acting Commissioner of Patents and Trademarks